(12) United States Patent
Rousseau

(10) Patent No.: US 10,023,155 B2
(45) Date of Patent: Jul. 17, 2018

(54) WIPER FLUID CONTAINER, MEMBER DESIGNED TO BE CONNECTED TO THAT CONTAINER, AND DEVICE COMPRISING SAID CONTAINER AND MEMBER

(71) Applicant: Valeo Systèmes d'Essuyage, Le Mesnil Saint Denis (FR)

(72) Inventor: Jean-François Rousseau, Charbonnier les Mines (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 59 days.

(21) Appl. No.: 14/897,072

(22) PCT Filed: Jun. 13, 2014

(86) PCT No.: PCT/EP2014/062415
§ 371 (c)(1),
(2) Date: Dec. 9, 2015

(87) PCT Pub. No.: WO2014/198916
PCT Pub. Date: Dec. 18, 2014

(65) Prior Publication Data
US 2016/0129889 A1 May 12, 2016

(30) Foreign Application Priority Data
Jun. 14, 2013 (FR) ..................... 13 55545

(51) Int. Cl.
*B60S 1/50* (2006.01)
*B67D 7/02* (2010.01)
*B60S 1/04* (2006.01)

(52) U.S. Cl.
CPC . *B60S 1/50* (2013.01); *B60S 1/04* (2013.01); *B67D 7/02* (2013.01); *B67D 7/0288* (2013.01)

(58) Field of Classification Search
CPC ...... B60S 1/04; B60S 1/46; B60S 1/48; B60S 1/50; B67D 7/02; B67D 7/0288; B67D 7/0294
See application file for complete search history.

(56) References Cited

U.S. PATENT DOCUMENTS 3,260,284 A * 7/1966 Kibler ..................... B60S 1/482
141/3
4,905,904 A   3/1990 Ohara et al.
(Continued)

FOREIGN PATENT DOCUMENTS

CN   101641246 A   2/2010
FR   2846634 A1   5/2004
(Continued)

OTHER PUBLICATIONS

The First Office Action issued in corresponding Chinese Patent Application No. 201480038769.0, dated Feb. 3, 2017 (17 pages).
(Continued)

Primary Examiner — Nicolas A Arnett
(74) Attorney, Agent, or Firm — Osha Liang LLP

(57) ABSTRACT

A wiper fluid container including a fluid dispensing opening and an opening of a connecting member. The fluid dispensing opening is equipped with a connector that works with another connector in order to ensure fluid communication between those openings, where one connector can move from a first closed position of the container to a second open position thereby freeing that opening.

16 Claims, 4 Drawing Sheets

(56) References Cited

U.S. PATENT DOCUMENTS

| | | | |
|---|---|---|---|
| 4,991,635 A | 2/1991 | Ulm | |
| 5,118,040 A * | 6/1992 | Abe | B60S 1/488 15/250.05 |
| 5,431,205 A * | 7/1995 | Gebhard | B67D 3/0032 141/286 |
| 5,853,034 A * | 12/1998 | Edwards | B67D 1/0015 141/100 |
| 6,105,638 A * | 8/2000 | Edwards | B67D 1/0015 141/100 |
| 6,397,908 B1 * | 6/2002 | Buchs | B67D 1/0835 141/285 |
| 8,453,685 B2 * | 6/2013 | Schultz, Jr. | F16L 29/04 137/614.04 |
| 8,899,498 B2 * | 12/2014 | Pilette | B60S 1/50 141/363 |
| 9,346,663 B1 * | 5/2016 | Schultz, Jr. | B67D 7/54 |
| 2002/0129869 A1 * | 9/2002 | Hydak | B67D 3/0038 141/352 |
| 2004/0112927 A1 | 6/2004 | Kaufman et al. | |
| 2010/0140378 A1 | 6/2010 | Pilette et al. | |
| 2013/0263970 A1 * | 10/2013 | Schultz, Jr. | F16L 29/04 141/301 |

FOREIGN PATENT DOCUMENTS

| | | |
|---|---|---|
| JP | S49-113346 U | 9/1974 |
| JP | 2002-526343 A | 8/2002 |
| JP | 2002-264961 A | 9/2002 |
| JP | 2010-168118 A | 8/2010 |

OTHER PUBLICATIONS

International Search Report issued in corresponding application No. PCT/EP2014/062415 dated Oct. 16, 2014 (4 pages).

French Search Report issued in corresponding application No. FR1355545 dated Mar. 14, 2014 (2 pages).

The Notification of Reason for Rejection issued in corresponding Japanese Patent Application No. 2016-518514, dated Apr. 3, 2018 (10 pages).

* cited by examiner

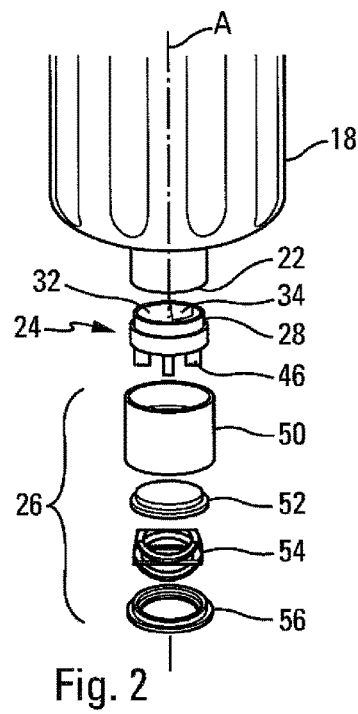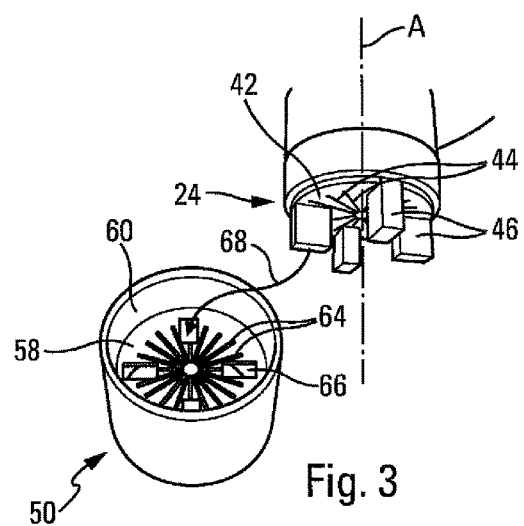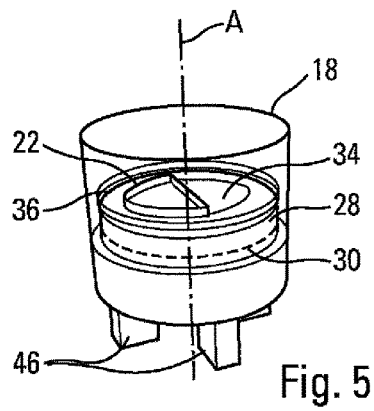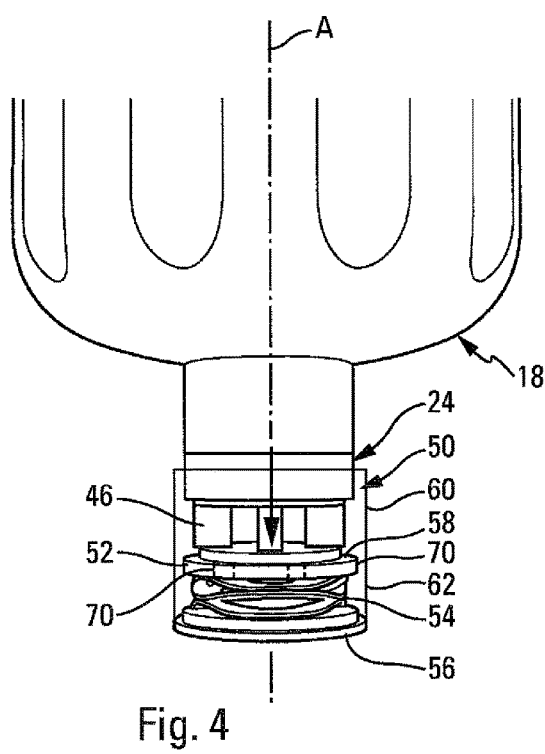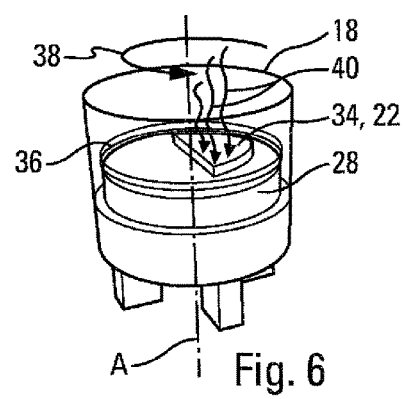
Fig. 2
Fig. 3
Fig. 4
Fig. 5
Fig. 6

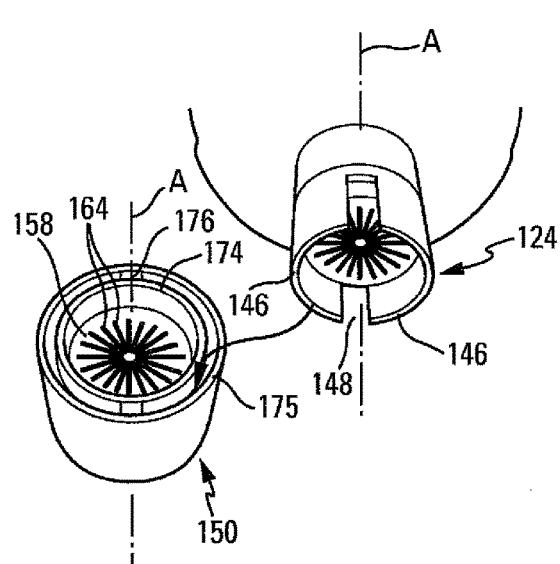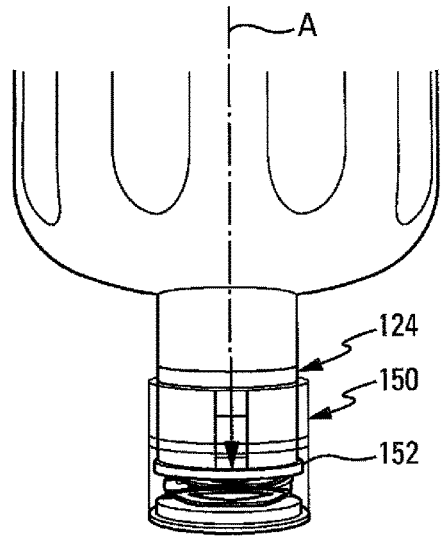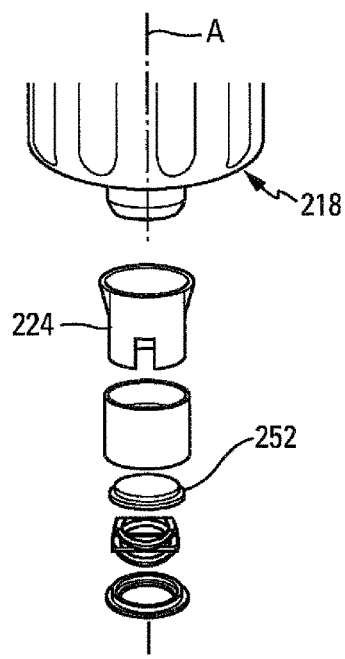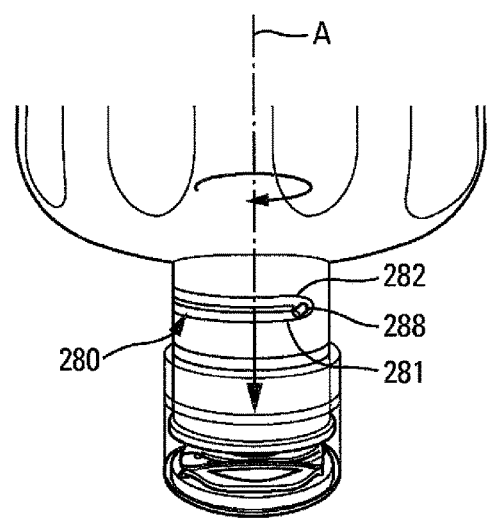
Fig. 7
Fig. 8
Fig. 9
Fig. 10

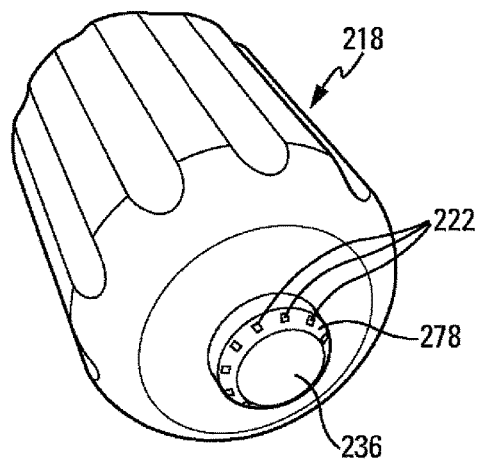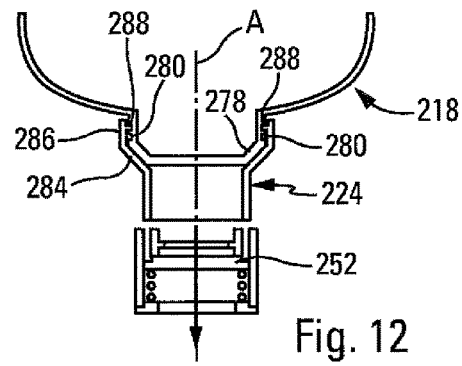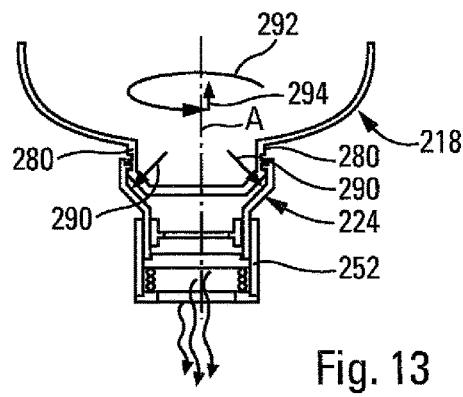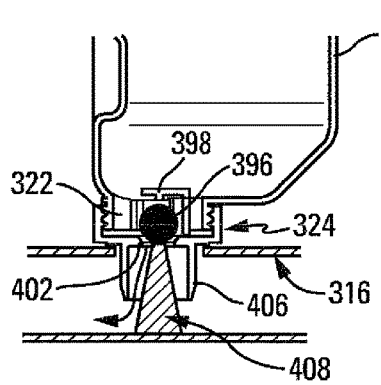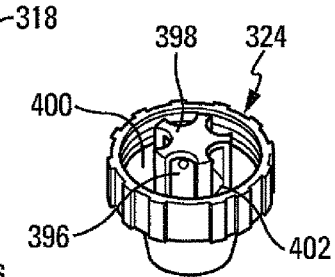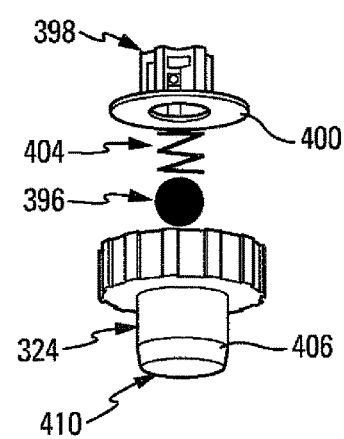
Fig. 11
Fig. 12
Fig. 13
Fig. 14
Fig. 15
Fig. 16

WIPER FLUID CONTAINER, MEMBER DESIGNED TO BE CONNECTED TO THAT CONTAINER, AND DEVICE COMPRISING SAID CONTAINER AND MEMBER

TECHNICAL FIELD

The present invention relates to a wiper fluid container, a member, such as a pump or a reservoir, designed to be connected to that container, a wiper fluid supply device, and a vehicle windshield washing system.

PRIOR ART

Motor vehicles are commonly equipped with washing systems for cleaning the windshield of that which might block the vehicle passengers' view, such as splashes, insects, frost or ice. Such washing systems are combined with windshield wiper systems and comprise a wiper fluid reservoir installed on the vehicle and spray means to enable the liquid contained in the reservoir to be sprayed toward the windshield. For enhanced cleaning of the windshield, it is possible to add to the usual wiper fluid a supplementary product suited to the season and/or to the effect sought. For example, this product may improve the removal of insects in the summer or the defrosting of the windshield in winter. It is generally added to the usual wiper fluid and sprayed on to the windshield in conjunction with said fluid.

In the technical field as it stands, filling of the reservoir with wiper fluid or the addition of the supplementary product into this reservoir is performed using a funnel, that part of the funnel of smallest cross section being inserted into an opening in the reservoir and the fluid or product then being poured into the flared part of the funnel, which has a larger cross section.

However, such filling is not without difficulty and may give rise to spillages of wiper fluid or supplementary product, the latter being relatively expensive. Indeed, when the container containing the supplementary product is brought close to the opening of the reservoir with a view to filling the latter, or is moved away from said reservoir after the latter has been filled, product is still able to escape from the container, which is uneconomical. Moreover, anyone can fill the reservoir in this way. There is thus a risk that an unsuitable product might be introduced into the reservoir and damage the washing system.

The particular object of the present invention is to provide a simple, effective and inexpensive solution to at least some of these problems.

DISCLOSURE OF THE INVENTION

The invention proposes a wiper fluid container, comprising a fluid dispensing opening equipped with first connecting means configured to cooperate with second connecting means of an opening of a member such as a pump or a reservoir in order to ensure fluid communication between those openings, characterized in that said first connecting means comprise an element that can move from a first position closing off the opening of the container to a second position of freeing that opening, these first means being configured to cooperate with the aforesaid second means in order to cause the movement of the movable member from the first to the second position.

The dispensing opening of the container is thus freed only when the movable element is in its second position. Movement of the movable member from the first to the second position results from cooperation between the connecting means of the container and of the member. Cooperation between the connecting means of the container and of the member is thus necessary to free the opening of the container and to allow the dispensing of fluid via said opening. In other words, in the absence of such cooperation, the opening of the container is closed off and the fluid in the container thus cannot exit via said opening. The invention therefore makes it possible to limit spillages of wiper fluid, such as a conventional cleaning liquid or a specific product (fly- or frost-removal product).

Preferably, the first connecting means comprise a bung mounted at the opening of the container and including at least one hole or one slit for the passage of liquid.

According to a first embodiment of the invention, the bung forms the aforesaid movable element and can be moved in rotation about its longitudinal axis relative to the container, between a first position in which the bung closes off the opening of the container and a second position in which said at least one hole or said at least one slit of the bung is in fluid communication with that opening.

Advantageously, the bung comprises a transverse wall in which said at least one hole or said at least one slit is formed. This transverse wall may be configured to prevent the use of a funnel for filling the container and, in particular, for preventing the engagement of the part of smaller cross section of this funnel in the opening of the container.

The bung may be configured to be at least partly embedded in the second connecting means. The bung preferably comprises locating means configured in order, in the embedded position, to cooperate with the corresponding means of the second connecting means to allow the member to be supplied with fluid. These locating means make it possible to limit the risk that a person might supply the member with an unsuitable product.

The locating means may comprise at least one projecting element carried by the bung and configured in order, in the embedded position, to cooperate with a movable element of the second connecting means in order to cause movement of that movable element and to allow the member to be supplied with fluid. Thus, if a container without a projecting element were connected to the member, it would be impossible to supply the member because the movable element would not be moved.

The bung may comprise a plurality of projecting elements that are evenly distributed about the longitudinal axis of the bung. These projecting elements may extend substantially radially relative to the longitudinal axis of the bung or are curved and extend about that longitudinal axis.

According to one aspect of the invention, the bung forms the movable element and can be moved in rotation about its longitudinal axis relative to the container and in translation along that longitudinal axis, the bung being movable in translation between a first position in which the bung closes off the opening of the container and a second position in which said at least one hole or said at least one slit of the bung is in fluid communication with that opening. This may be implemented by means of a bayonet or thread link between the bung and the container.

According to a further embodiment of the invention, the movable element is a bead enclosed in a housing of the bung and urged by return means into a position closing off a hole of the bung, in which the bead bears against a seat extending around that hole.

The present invention also relates to a member, such as a pump or a reservoir, comprising a wiper fluid supply opening equipped with second connecting means configured to cooperate with the first connecting means of the container as described above.

In the case of the aforesaid first embodiment, the second connecting means of the member may comprise a cylindrical ring mounted at the opening of the member and including a transverse wall that comprises at least one hole or one slit for the passage of liquid. As described above, this transverse wall may be configured to prevent the use of a funnel to supply the member and, in particular, to prevent the engagement of the part of smaller cross section of said funnel in the opening of the container. The member may thus be supplied with fluid only via the container according to the invention.

Advantageously, a membrane is movably mounted in the ring between a first position in which the membrane bears on the transverse wall in order to close off said at least one hole or said at least one slit and a position in which the membrane is separate from the wall to allow the passage of fluid through said at least one hole or said at least one slit, return means being mounted in the ring to urge the membrane into its first position.

The ring may comprise at least one hole or one slit configured in order to be traversed by at least one locating projecting element of the first connecting means, which is designed to bear against the membrane with a view to the movement thereof. Said at least one hole or said at least one slit designed to be traversed by said at least one projecting element may be formed in the transverse wall of the ring or around same.

In the case of the aforesaid second embodiment, the second connecting means of the member may comprise a finger mounted at the opening of the member and configured to cooperate with the bead and to cause the movement thereof from the first to the second position thereof.

The present invention also relates to a wiper fluid supply device comprising a container and a member as described above.

The present invention relates, lastly, to a vehicle windshield washing system comprising a wiper fluid supply device of the aforesaid type, means for spraying the windshield with said fluid, and means for wiping the windshield.

The present invention also relates to a wiper fluid container comprising a fluid dispensing opening equipped with first connecting means configured to cooperate with second connecting means of an opening of a member such as a pump or a reservoir in order to ensure fluid communication between those openings, characterized in that said first connecting means comprise anti-rotation means configured to cooperate with corresponding means of the second means in order to secure said first and second means in rotation.

The present invention also relates to a wiper fluid container comprising a fluid dispensing opening equipped with first connecting means configured to cooperate with second connecting means of an opening of a member such as a pump or a reservoir in order to ensure fluid communication between those openings, characterized in that said first connecting means comprise locating means configured to cooperate with corresponding means of the second means in order to allow said fluid communication.

The present invention also relates to a wiper fluid container comprising a fluid dispensing opening equipped with first connecting means configured to cooperate with second connecting means of an opening of a member such as a pump or a reservoir in order to ensure fluid communication between those openings, characterized in that said first connecting means comprise fill-prevention means configured to prevent filling of the container using a funnel, for example.

The present invention also relates to a member such as a pump or a reservoir, comprising a wiper fluid supply opening equipped with second connecting means configured to cooperate with the first connecting means of the container as described above.

The present invention also relates to a member such as a pump or a reservoir, comprising a wiper fluid supply opening equipped with second connecting means configured to cooperate with first connecting means of a fluid dispensing opening of a wiper fluid container, to ensure fluid communication between those openings, characterized in that said second connecting means comprise anti-rotation means configured to cooperate with corresponding means of the first means in order to secure said first and second means in rotation.

The present invention also relates to a member such as a pump or a reservoir, comprising a wiper fluid supply opening equipped with second connecting means configured to cooperate with first connecting means of a fluid dispensing opening of a wiper fluid container, to ensure fluid communication between those openings, characterized in that said second connecting means comprise locating means configured to cooperate with corresponding means of the first means in order to allow said fluid communication.

The present invention also relates to a member such as a pump or a reservoir, comprising a wiper fluid supply opening equipped with second connecting means configured to cooperate with first connecting means of a fluid dispensing opening of a wiper fluid container, to ensure fluid communication between those openings, characterized in that said second connecting means comprise fill-prevention means configured to prevent filling of the member using a funnel, for example.

Lastly, the invention proposes a member such as a pump or a reservoir, comprising a wiper fluid supply opening equipped with second connecting means configured to cooperate with first connecting means of a fluid dispensing opening of a wiper fluid container, to ensure fluid communication between those openings, characterized in that said second connecting means comprise an element that can move from a first position closing off the opening of the container to a second position of freeing that opening, these first means being configured to cooperate with the aforesaid first means to cause the movement of the movable member from the first to the second position.

DESCRIPTION OF THE FIGURES

The invention will be better understood and further details, characteristics and advantages of the invention will become apparent on reading the following description given by way of non-limiting example with reference to the appended drawings, in which:

FIG. 2 is a schematic expanded perspective view of a container and of means for connecting this container to a member according to one embodiment of the invention;

FIG. 3 is a schematic perspective view of certain components of the connecting means of FIG. 2;

FIG. 4 is a schematic perspective view, partially transparently showing the container and the connecting means of FIG. 2;

FIGS. 5 and 6 are schematic perspective views transparently showing the bung of the container of FIG. 2 and illustrating two different positions of the bung on the container;

FIGS. 7 and 8 are views corresponding to FIGS. 3 and 4, respectively, and show a variant embodiment of the invention;

FIGS. 9 and 10 are views corresponding to FIGS. 2 and 4, respectively, and show a further variant embodiment of the invention;

FIG. 11 is a schematic perspective view of the container of the variant embodiment of FIGS. 9 and 10;

FIGS. 12 and 13 are schematic views in axial section of the container and of means for connecting this container to the member, according to the variant embodiment of FIGS. 9 and 10;

FIG. 14 is a schematic view in axial section of a container and of its connecting means, according to a further variant embodiment of the invention; and FIGS. 15 and 16 are schematic perspective views of the bung of the container of FIG. 14.

DETAILED DESCRIPTION

Figure 1:
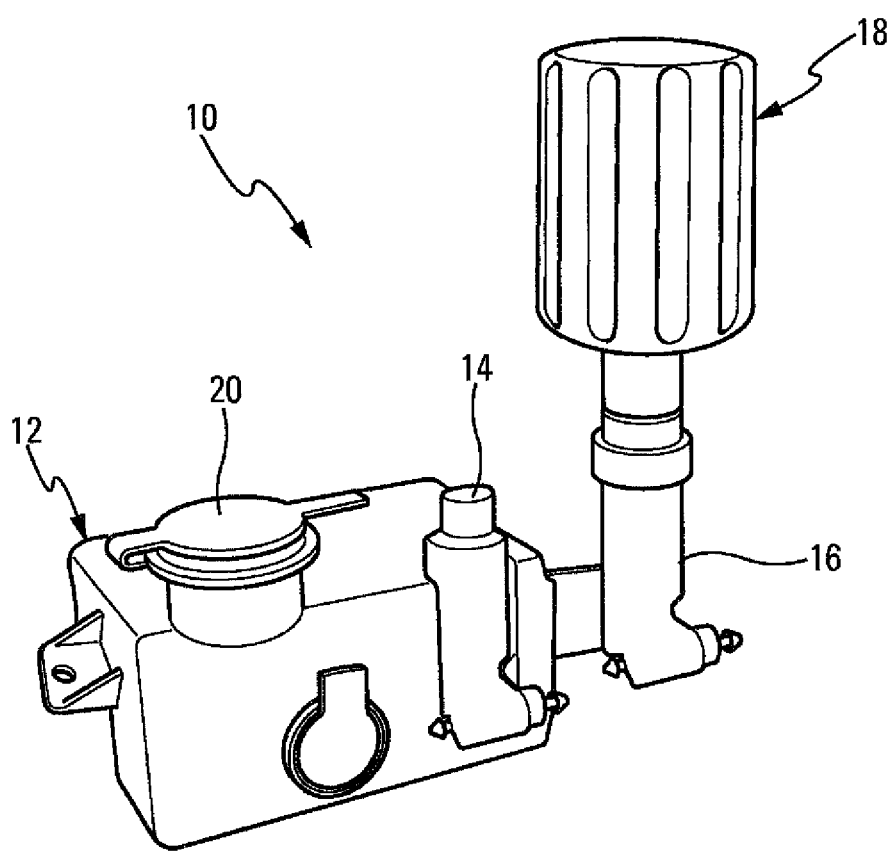
FIG. 1 is a schematic perspective view of a wiper fluid supply device for a vehicle windshield washing system.

Reference is made, first, to FIG. 1, which shows a wiper fluid supply device 10 for a vehicle windshield washing system. Conventionally, in addition to the device 10, this system comprises means for spraying the windshield with the wiper fluid and means for wiping the windshield.

The device 10 comprises a wiper fluid reservoir 12 connected to a first pump 14 for supplying the washing system with the fluid contained in this reservoir, and which carries a second pump 16 connected to a wiper fluid container 18 for supplying the system with the fluid contained in this container 18. The fluids in the reservoir 12 and the container 18 may be the same or different. The reservoir 12 comprises, for example, a cleaning liquid, and the container 18 comprises, for example, a fly-removal or antifreeze product.

The reservoir 12 comprises a filling opening closed by a removable bung 20. The container 18 has the shape of a bottle in the example shown and comprises a fluid dispensing opening at the bottle neck, which is connected by connecting means according to the invention to an inlet or opening of the pump 16.

FIGS. 2 to 6 show a first embodiment of the invention. The container 18 carries at its dispensing opening 22 first connecting means formed by a bung 24, this bung being designed to cooperate with second connecting means 26 mounted on the pump, at the opening thereof, to allow fluid communication between the container and the pump, i.e. the dispensing of fluid by the container and the supply of the pump with fluid.

The bung 24 has a general cylindrical shape of longitudinal axis A. At one end, it comprises a cylindrical lip 28 for insertion in the neck of the container 18, this cylindrical lip including, for example, an integral external annular beading (schematically shown by broken lines 30 in FIG. 5) engaged by elastic snap-fitting in an internal annular groove of the internal wall of the neck, to ensure axial retention (along the axis A) of the bung relative to the container. The integral beading 30 is configured to cooperate by sliding in the groove in order to guide the bung 24 in rotation relative to the container 18, about the axis A. The bung is thus mounted in rotation about the axis A on the container.

The bung 24 comprises a first transverse wall 32 at the cylindrical lip 28. This transverse wall 32 comprises a through-hole 34 that, in this case, is substantially in the shape of a semicircle and is located on a semicircular semi-portion of the wall 32. The neck of the container also comprises a transverse wall 36 that comprises the aforesaid opening 22, which, in this case, is substantially in the form of a semicircle and is located on a semicircular semi-portion of the wall 36 (FIGS. 5 and 6).

As may be seen in FIGS. 5 and 6, the bung 24 can be moved in rotation (arrow 38) relative to the container 18, between a position in which the hole 34 in the wall of the bung is not aligned with the opening 22, which is then closed off by the wall 32 of the bung, and a position in which the hole 34 and the opening 22 are aligned, which allows the dispensing of the fluid contained in the container via the opening 22 thereof (arrows 40).

The bung 24 comprises a second transverse wall 42 at its end opposite the lip 28. This transverse wall 42 comprises an annular row of radial (relative to the axis A) slits 44, which are evenly distributed about the axis A. These slits 44 are in fluid communication with the hole 34 in the bung.

The bung 24 furthermore comprises an annular row of longitudinal fingers 46 projecting from the wall 42 and extending from this wall, of the side opposite the lip 28. These fingers 46 are parallel with one another and with the axis A. They each have a substantially parallelepipedal shape and a rectangular shape in cross section. In this case they are four in number and are evenly distributed about the axis A, in the vicinity of the external peripheral edge of the wall 42.

In the example shown, the means 26 for connecting to the opening of the pump comprise four elements: a ring 50, a membrane 52 mounted movably in the ring 50, a spring 54 mounted in the ring and forming return means bearing against the membrane, and an annulus 56 for retaining the membrane 52 and the spring 54 in the ring.

The ring 50, which can be seen better in FIG. 3, has a cylindrical general shape and comprises a transverse wall 58 located substantially in the middle of the ring and delimiting internal cylindrical recesses of the ring, respectively an upper 60 and a lower 62 (FIGS. 3 and 4) recess.

The transverse wall 58 comprises an annular row of radial (relative to the longitudinal axis of the ring, which, in the assembled position, merges with the axis A) slits 64, which are evenly distributed about this longitudinal axis. These slits 64 are through-slits and ensure fluid communication between the recesses 60 and 62 of the ring 50.

The wall 58 further comprises an annular row of holes 66 through which the fingers 46 of the bung pass. These holes 66 each have a substantially rectangular shape and dimensions that are slightly larger than the transverse dimensions of the fingers 46 of the bung. In this case, they are four in number and are evenly distributed about the axis A, in the vicinity of the external peripheral edge of the wall 58.

The bung 24 is designed to be engaged in the upper recess 60 of the ring 50 and its fingers 46 are designed to pass through the holes 66 in the wall 58 of the ring upon such engagement. To that end, the bung 24 must be pre-aligned on the ring and positioned at an angle about the axis A, such that its fingers 46 are aligned with the holes 66 (arrow 68).

The membrane 52 is substantially circular and is mounted in the lower recess 62 of the ring 50, and intercalated between the wall 58 of the ring and the spring 54. The membrane 52 can move in translation along the axis A in this recess 62, between a first position in which it bears axially against the wall 58 and closes off the slits 64 in said wall, to prevent the supply of fluid to the pump, and a second position in which it is at a distance axially from the wall 58 and leaves the slits 64 free. The movement of the membrane 52 from the first to the second position is caused by axial bearing of the fingers 46 against the upper face of the membrane when these fingers pass through the holes 66 in the wall 58 of the ring, as shown in FIG. 4.

The membrane 52 comprises, at its external periphery, axial notches 70 shown schematically by broken lines in FIG. 4. These notches 70 are located opposite a peripheral part of the wall 58 of the ring that does not have slits, i.e. is not traversed by the aforesaid slits 64. Thus, when the membrane 52 is in its first position, it closes off the slits 64 completely and the fluid cannot pass through them. When the membrane 52 is in its second position, the notches 70 define, together with the internal cylindrical surface of the ring 50, spaces for the passage of the fluid, which has passed through the slits 64 in the wall 58.

The annulus 56 is fixed to the lower end of the ring 50 and holds the spring 54 so that it bears against the membrane 52. In the assembled position, and when the membrane 52 is in the aforesaid first position, the spring 54 is slightly pre-stressed between the membrane and the annulus 56, the force exerted by the spring on the membrane being sufficient to ensure a seal between the wall 58 and the membrane 52.

The container 18 may be connected to the pump as follows: the bung 24 is preassembled on the neck of the container containing the wiper fluid. Prior to first use, the transverse wall 58 of the bung may be covered with a capsule to guarantee that the container has never been used and this capsule has to be removed prior to connecting the container to the pump. The connecting means 26 are also preassembled by appropriate means in or on the opening of the pump. The container 18 is arranged above the connecting means 26 and aligned thereon, as shown in FIG. 2, the fingers 46 of the bung 24 being aligned axially on the holes 66 in the ring 50 of the connecting means 26. The container is then moved by translation along the axis A toward the ring 50, until the bung engages in the upper recess 60 of the ring and its fingers 46 pass through the holes 66 in the wall 58 of the ring. When passing through these holes 66, the fingers 46 bear against the membrane 52 and move it in translation along the axis A to separate it from the wall 58. The opening of the pump is then in fluid communication with the upper recess 60 of the ring, via the notches 70 of the membrane and the slits 64 in the wall 58 of the ring. However, this is not sufficient to ensure fluid communication between the pump and the container 18 because the opening of the latter is still closed off by the bung 24. The container 18 has to be moved in rotation about the axis A relative to the bung 24 and the connecting means 26. The fingers 46 of the bung cooperate with the ring 50 to form anti-rotation means rendering the bung secure in rotation with the ring, while these fingers are engaged in the holes 66 in the wall 58 of the ring. The container 18 is thus turned until the hole 34 in the bung is in fluid communication with the opening 22 of the container, which, in the example shown, represents a movement of the bung substantially through one half-turn about the axis A (FIGS. 5 and 6). Fluid communication between the openings of the container and of the pump is then established.

In the embodiment described above, the fingers 46 of the bung 24 form, in particular, together with complementary means of the connecting means 26, anti-rotation means and locating means preventing the supply to the pump in the event of the use of a bung without such fingers.

The variant embodiment of FIGS. 7 and 8 differs from the embodiment described above notably in that the anti-rotation and locating means of the bung 124 are formed by fingers of different forms or, alternatively, curved walls 146, the radius of curvature of which is centered on the axis A. These walls 146 are in this case two in number. They extend along the axis A on the side opposite the aforesaid lip 28 and have an external diameter substantially equal to the external diameter of the bung. They thus extend along the axis A in the extension of the bung. They are separated from one another by circumferential spaces 148.

The ring 150 differs from that 50 of the preceding embodiment notably in terms of the form and the position of the passage holes of the anti-rotation means (walls 146), the free ends of which are designed to bear against the membrane 152 mounted in the ring with a view to the movement thereof.

The transverse wall 158 of the ring 150, which includes the radial slits 164, is connected at its external periphery to a cylindrical skirt 174 that internally defines the upper cylindrical recess of the ring, in which the bung 124 is designed to engage. This skirt 174 is coaxial to the cylindrical wall 175 of the ring and extends inside same and at a distance therefrom. It is connected to the wall 175 of the ring by two diametrically opposed longitudinal webs 176. The wall 175 and the skirt 174 of the ring define between them two circumferential spaces which are separated from one another by the webs 176 and in which the walls 146 of the bung are designed to engage. When the walls 146 of the bung are engaged in these spaces, the circumferential ends thereof may abut against the webs, in such a manner as to form anti-rotation means for the bung relative to the ring.

The way in which this variant functions may be similar to that of the embodiment described above.

The variant embodiment of FIGS. 9 to 13 differs from the preceding variant notably in terms of the assembly of the bung 224 on the neck of the container 218.

The neck of the container 218 comprises a cylindrical wall, the free end of which is connected to the end of largest diameter of a frustoconical wall 278 of which the end of smallest diameter is connected to a solid transverse wall 236 (FIG. 11). The frustoconical wall 278 comprises an annular row of through-holes that form the dispensing opening 222 of the container.

The cylindrical wall of the neck of the container comprises, on its external surface, two diametrically opposed U-grooves 280, only one of which can be seen in FIG. 10. Each groove 280 comprises two circumferential parts, a lower part 281 and an upper part 282, respectively, which extend about the axis A. These parts 281, 282 are substantially identical and extend over the same angular range about the axis A. They are arranged one above the other, and one of the circumferential ends of one part is connected to the adjacent circumferential end of the other part (FIG. 10).

The bung 224 differs from the bung 124 of the preceding variant notably in that the end thereof that is located on the container side comprises a frustoconical wall 284, the end of largest diameter of which is connected to a cylindrical lip 286 for assembly on the neck of the container (FIGS. 12 and 13). In the assembled position, in which the opening 222 of the container is closed (FIG. 12), the lip 286 surrounds the cylindrical wall of the neck and the frustoconical wall 284 surrounds the frustoconical wall 278 of the neck.

The cylindrical lip 286 of the bung 224 comprises two diametrically opposed studs 288 that project from the internal surface of the bung and are each engaged slideably in one of the grooves 280 of the neck (FIG. 10). Each stud 288 can move in the corresponding groove, for example from the part 282 of this groove as far as the part 281 thereof. This movement is caused by a rotation of the container 218 relative to the bung 224, about the axis A, and a translation of the container along the axis A relative to the bung. In the case where the studs 288 are located at the free ends of the upper parts 282 of the grooves, a rotation of the container relative to the bung is necessary in order to move the studs 288 as far as the opposite ends of the parts 282. A translation of the container relative to the bung, on the side opposite the pump, makes it possible to move the studs from the part 282 to the part 281 of each groove 280. A further rotation of the container relative to the bung, in the opposite direction from the rotation effected previously, makes it possible to move the studs 288 as far as the free ends of the parts 281 of the grooves.

The bung 224 is designed in order that, when the studs are in the lower parts 281 of the grooves 280, the frustoconical walls 278 and 284 of the neck and of the bung bear against one another and the holes 222 of the wall 278 are thus closed off by the wall 284 (FIG. 12), and in order that, when the studs are in the upper parts 282 of the grooves, the walls 278 and 284 are at a distance from one another and the fluid contained in the container 218 is able to be dispensed via the holes 222 (FIG. 13—arrows 290).

The bung 224 and the neck of the container are thus connected together by a bayonet-type link. In a variant, this link, which allows a rotation and a translation of the bung on the neck, could be of the threaded type, the bung including a thread screwed into a thread of complementary form of the neck.

As explained above, the simple engagement of the bung 224 in the connecting means of the pump, which makes it possible to move the membrane 252 from its first to its second position, does not on its own ensure fluid communication between the openings of the container and of the pump. Prior to connection of the container to the pump, the bung is in the position shown in FIG. 12, in which the holes 222 of the container are closed off. After engagement of the bung in the connecting means of the pump, the container is turned about the axis A to bring the studs 288 of the free ends of the parts 282 of the grooves 280 to their opposite ends (arrows 292). The container is then moved by translation on the side opposite the pump in order that the studs pass into the lower parts 281 of the grooves (arrow 294). Fluid communication between the openings of the container and of the pump is thus established. It is possible to keep the container in this open position by turning the container relative to the bung such that the studs 288 move as far as the free ends of the parts 280 of the grooves.

Reference will now be made to FIGS. 14 to 16, which show a further variant embodiment of the invention in which the bung 324 comprises a bead 396 enclosed in a cage 398 affixed to the bung.

The bung 324 is in this case screwed onto the neck of the container 318 and can be affixed permanently on this neck. The bung comprises a transverse wall 400 that includes a central hole 402, this central hole having a diameter smaller than that of the bead and being shaped to form a seat for this bead 396. The bead 396 can be moved inside its cage 398 between a position in which it bears against the seat and closes off the hole 402 and a position in which it is at a distance from the seat and thus leaves free the hole 402, which then is in communication with the opening 322 of the container. Return means, such as a spring 404, are mounted in the cage 390 and urge the bead 396 into the position closing off the hole 402.

The bung 324 further comprises a cylindrical lip 406 for engagement in the opening of a reservoir 316. As schematically shown in FIG. 14, this reservoir 316 carries a finger 408 designed to bear against the bead 396 and to move it at the time of said engagement. In the engaged position, the finger 408 is engaged in the lip 406 and its free end bears against the bead 396 and moves it away from its seat. The fluid contained in the container 318 is then able to pass through the hole 402 of the bung as far as the reservoir 316.

In this variant, a single movement in translation of the container relative to the reservoir, until the bung engages in the opening of the reservoir, is sufficient to establish fluid communication between the container and the reservoir.

The free end of the cylindrical lip 406 of the bung may be covered by a capsule 410 of the aforesaid type, designed to be torn away by the finger 408 at the time of assembly of the container.

The invention claimed is:

1. A wiper fluid container, comprising:
a fluid dispensing opening equipped with first connecting means configured to cooperate with second connecting means of an opening of a member comprising one selected from the group consisting of a pump or a reservoir, in order to ensure fluid communication between both the fluid dispensing opening and the opening of the member,
wherein said first connecting means comprise:
a movable element that moves from a first position closing off the opening of the container to a second position of freeing that opening, the first connecting means being configured to cooperate with the second connecting means in order to cause the movement of the movable element from the first position to the second position, and
a bung mounted at the opening of the container and including at least one hole or slit for the passage of liquid, and
wherein the bung forms the movable element that moves in rotation about a longitudinal axis relative to the container, between a first position in which the bung closes off the opening of the container and a second position in which said at least one hole or slit of the bung is in fluid communication with the opening.

2. The container as claimed in claim 1, wherein the bung comprises a transverse wall in which said at least one hole or said at least one slit is formed.

3. The container as claimed in claim 1, wherein the bung is configured to be at least partly embedded in the second connecting means and comprises locating means configured in order, in the embedded position, to cooperate with the second connecting means to allow the member to be supplied with fluid.

4. The container as claimed in claim 3, wherein the locating means comprise at least one projecting element carried by the bung and configured in order, in the embedded position, to cooperate with a movable element of the second connecting means in order to cause movement of that movable element and to allow the member to be supplied with fluid.

5. The container as claimed in claim 4, wherein the bung comprises a plurality of projecting elements that are evenly distributed about the longitudinal axis of the bung.

6. The container as claimed in claim 5, wherein the projecting elements extend substantially radially relative to the longitudinal axis of the bung or are curved and extend about that longitudinal axis.

7. The container as claimed in claim 1, wherein the bung forms the movable element and can be moved in rotation about its longitudinal axis relative to the container and in translation along that longitudinal axis, the bung being movable in translation between a first position in which the bung closes off the opening of the container and a second position in which said at least one hole or said at least one slit of the bung is in fluid communication with that opening.

8. The container as claimed in claim 1, wherein the movable element is a bead enclosed in a housing of the bung and urged by return means into a position closing off a hole of the bung, in which the bead bears against a seat extending around that hole.

9. A member, comprising a wiper fluid supply opening equipped with second connecting means configured to cooperate with the first connecting means of the container as claimed in claim 1.

10. The member as claimed in claim 9, wherein said second connecting means comprise a cylindrical ring mounted at the opening of the member and including a transverse wall that comprises at least one hole or one slit for the passage of liquid.

11. The member as claimed in claim 10, wherein a membrane is movably mounted in the ring between a first position in which the membrane bears on the transverse wall in order to close off said at least one hole or said at least one slit and a position in which the membrane is separate from the wall to allow the passage of fluid through said at least one hole or said at least one slit, return means being mounted in the ring to urge the membrane into its first position.

12. The member as claimed in claim 11, wherein the ring comprises at least one hole or one slit configured in order to be traversed by at least one locating projecting element of the first connecting means, which is designed to bear against the membrane with a view to the movement thereof.

13. The member as claimed in claim 12, wherein said at least one hole or said at least one slit designed to be traversed by said at least one projecting element is formed in the transverse wall of the ring or around same.

14. The member as claimed in claim 9, wherein said second connecting means comprise a finger mounted at the opening of the member and configured to cooperate with a bead and to cause the movement thereof from the first to the second position thereof.

15. A wiper fluid supply device comprising:
a container having a fluid dispensing opening equipped with first connecting means,
a member configured to cooperate with a second connecting means of an opening of a member in order to ensure fluid communication between both the fluid dispensing opening and the opening of the member;
wherein a first connecting means comprise a movable element that can move from a first position closing off the opening of the container to a second position of freeing that opening, these first connecting means being configured to cooperate with the second connecting means in order to cause the movement of the movable element from the first position to the second position, and
wherein the movable element is a bead enclosed in a housing of a bung mounted at the opening of the container, the bung having at least one hole or one slit for passage of liquid, wherein the movable element is urged by return means into a position closing off the hole or the slit of the bung, in which the bead bears against a seat extending around the hole or the slit.

16. A vehicle windshield washing system, comprising:
a device as claimed in claim 15;
means for spraying a windshield with said fluid; and
means for wiping the windshield.

\* \* \* \* \*